(12) United States Patent
Lammers et al.

(10) Patent No.: US 8,606,461 B2
(45) Date of Patent: Dec. 10, 2013

(54) SYSTEM AND METHOD FOR MONITORING TIRE STATUS

(75) Inventors: Shawn D. Lammers, Delta (CA); Robert Patterson, Burnaby (CA); Timothy J. Frashure, Columbia Station, OH (US); Thomas Weed, North Ridgeville, OH (US); Daniel P. Zula, North Ridgeville, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 0 days.

(21) Appl. No.: 13/316,047

(22) Filed: Dec. 9, 2011

(65) Prior Publication Data

US 2013/0151067 A1 Jun. 13, 2013

(51) Int. Cl.
*G06F 7/00* (2006.01)

(52) U.S. Cl.
USPC .............. 701/36; 701/1; 701/42; 340/5.67; 340/442

(58) Field of Classification Search
USPC .......... 701/29, 33, 36, 31.4, 70, 1, 42, 305; 340/431, 442, 447, 445, 870.16, 5.67; 152/152.1, 416; 73/146.5
See application file for complete search history.

(56) References Cited

U.S. PATENT DOCUMENTS

| | | | |
|---|---|---|---|
| 3,780,373 A | 12/1973 | Holst et al. | |
| 4,328,494 A | 5/1982 | Goodall | |
| 5,231,872 A | 8/1993 | Bowler et al. | |
| 5,481,253 A * | 1/1996 | Phelan et al. | 340/5.67 |
| 5,606,732 A | 2/1997 | Vignone, Sr. | |
| 5,717,135 A * | 2/1998 | Fiorletta et al. | 73/146.5 |
| 5,839,534 A | 11/1998 | Chakraborty et al. | |
| 5,977,870 A * | 11/1999 | Rensel et al. | 340/447 |
| 6,034,597 A | 3/2000 | Normann et al. | |
| 6,087,930 A * | 7/2000 | Kulka et al. | 340/447 |
| 6,181,241 B1 | 1/2001 | Normann et al. | |
| 6,198,995 B1 | 3/2001 | Settles et al. | |

(Continued)

FOREIGN PATENT DOCUMENTS

| | | |
|---|---|---|
| EP | 1714804 A2 | 10/2006 |
| WO | 2001070520 A1 | 9/2001 |
| WO | 2005113261 A1 | 12/2005 |

OTHER PUBLICATIONS http://www.onstar.com/web/portal/diagnosticinfo (printed_).

(Continued)

*Primary Examiner* — Tuan C. To
*Assistant Examiner* — Yuri Kan
(74) *Attorney, Agent, or Firm* — Calfee, Halter & Griswold LLP

(57) ABSTRACT

A vehicle electronic control unit includes a power input port, which receives electric power from a vehicle battery, and a power output port, which provides electric power to a vehicle electronic device including an antenna. The electronic device receives data transmissions from a vehicle sensor. The power output port provides substantially uninterrupted electric power from the vehicle battery to the vehicle electronic device. A communication port is electrically connected to a vehicle communication bus. The communication port receives data transmissions from the vehicle electronic device via the communication port. An electronic component, electrically connected to the communication port, is initially in a first state when a vehicle ignition is off. The electronic component, while in a second state and while the vehicle ignition is off, receives additional data transmissions from the vehicle electronic device indicating statuses of respective vehicle sensors.

22 Claims, 3 Drawing Sheets

(56) References Cited

U.S. PATENT DOCUMENTS

| | | | |
|---|---|---|---|
| 6,229,452 | B1 | 5/2001 | Kull |
| 6,232,875 | B1 | 5/2001 | DeZorzi |
| 6,289,332 | B2 | 9/2001 | Menig et al. |
| 6,293,096 | B1 | 9/2001 | Khair et al. |
| 6,357,839 | B1 | 3/2002 | Eckert |
| 6,400,261 | B1 * | 6/2002 | Starkey et al. ............. 340/442 |
| 6,501,372 | B2 | 12/2002 | Lin |
| 6,518,875 | B2 | 2/2003 | DeZorzi |
| 6,549,972 | B1 | 4/2003 | Berstis et al. |
| 6,581,449 | B1 | 6/2003 | Brown et al. |
| 6,603,394 | B2 | 8/2003 | Raichle et al. |
| 6,630,885 | B2 | 10/2003 | Hardman et al. |
| 6,775,282 | B1 | 8/2004 | Vakkalagadda et al. |
| 6,794,993 | B1 | 9/2004 | Kessler et al. |
| 6,850,155 | B1 * | 2/2005 | McQuade ................. 340/442 |
| 6,885,291 | B1 * | 4/2005 | Pollack et al. ............. 340/445 |
| 6,888,934 | B2 | 5/2005 | Bell |
| 6,899,153 | B1 * | 5/2005 | Pollack et al. ............ 152/152.1 |
| 6,906,624 | B2 * | 6/2005 | McClelland et al. ......... 340/442 |
| 6,972,671 | B2 | 12/2005 | Normann et al. |
| 7,139,653 | B2 | 11/2006 | Ringger et al. |
| 7,149,206 | B2 | 12/2006 | Pruzan et al. |
| 7,161,476 | B2 | 1/2007 | Hardman et al. |
| 7,253,784 | B2 | 8/2007 | Shimura |
| 7,309,260 | B2 | 12/2007 | Brower et al. |
| 7,348,878 | B2 | 3/2008 | Fogelstrom |
| 7,889,074 | B2 | 2/2011 | Anderson |
| 7,890,229 | B2 | 2/2011 | Huebl |
| 8,026,803 | B2 | 9/2011 | Lin et al. |
| 2002/0140574 | A1 * | 10/2002 | Starkey et al. ........... 340/870.16 |
| 2003/0197603 | A1 | 10/2003 | Stewart et al. |
| 2004/0055370 | A1 | 3/2004 | Normann et al. |
| 2004/0155763 | A1 | 8/2004 | Lin et al. |
| 2004/0178897 | A1 | 9/2004 | Fennel et al. |
| 2005/0002417 | A1 | 1/2005 | Kelly et al. |
| 2005/0104715 | A1 | 5/2005 | Farrell |
| 2006/0025897 | A1 | 2/2006 | Shostak et al. |
| 2006/0168378 | A1 | 7/2006 | Muth |
| 2007/0035452 | A1 | 2/2007 | Lin et al. |
| 2007/0038346 | A1 | 2/2007 | Ehrlich et al. |
| 2007/0156320 | A1 * | 7/2007 | Breed et al. ................. 701/70 |
| 2007/0279203 | A1 | 12/2007 | Thomas et al. |
| 2008/0191855 | A1 | 8/2008 | Fink et al. |
| 2008/0246604 | A1 | 10/2008 | McPherson et al. |
| 2008/0319607 | A1 | 12/2008 | Schindler et al. |
| 2009/0088910 | A1 * | 4/2009 | Yi et al. ..................... 701/1 |
| 2009/0224869 | A1 | 9/2009 | Baker et al. |
| 2010/0057299 | A1 * | 3/2010 | Burgdorf et al. ............ 701/42 |
| 2010/0198427 | A1 | 8/2010 | Fogelstrum et al. |
| 2010/0305809 | A1 * | 12/2010 | Audisio et al. ............. 701/33 |
| 2011/0191000 | A1 | 8/2011 | Grolle |

OTHER PUBLICATIONS

International Search Report for counterpart PCT Patent Application No. PCT/US2012/068399, mailed Mar. 25, 2013.

Written Opinion for counterpart PCT Patent Application No. PCT/US2012/068399, mailed Mar. 25, 2013.

http://www.onstar.com/web/portal/diagnosticinfo (Printed Dec. 8, 2011).

Smartire by Bendix Operators Manual BW-2799, Jun. 2010.

Driver Instructions—Collision Warning, SmartCruise, Side Object Detection, VORAD SmartCruise® System, pp. 9-11, Eaton Corporation, Feb. 2009.

Non-Final Office Action in U.S. Appl. No. 13/037,786, dated Jun. 20, 2013.

Response to Non-Final Office Action in U.S. Appl. No. 13/037,786, dated Sep. 20, 2013.

* cited by examiner

SYSTEM AND METHOD FOR MONITORING TIRE STATUS

BACKGROUND

The present invention relates to a vehicle electronic monitoring system. It finds particular application in conjunction with an electronic tire status monitoring system and will be described with particular reference thereto. It will be appreciated, however, that the invention is also amenable to other applications.

It is desirable to monitor vehicle statuses to ensure a vehicle is maintained and operating as safely and efficiently as possible. Currently available tire status monitoring systems are limited as to the type of data collected, when the data is collected, and when/how the data is communicated to a vehicle operator, personal responsible for maintaining the vehicle, and/or a vehicle owner.

Typical systems require the vehicle ignition to be on before tire statuses are monitored and/or remote recipients are notified. Typical tire status sensors may only sense a tire's status(es) and/or transmit data transmissions indicative of the sensed status(es) every several minutes or hours. Therefore, if the vehicle ignition is turned-on shortly after a tire parameter sensor sensed a tire's status(es) and/or transmitted data indicative of the sensed status(es) in a conventional system, it may create an undesirable delay before the vehicle operator or another remote recipient is notified of any out-of-range status(es) for any of the tires on the vehicle. Such undesirable delays may create safety and/or other concerns.

The present invention provides a new and improved apparatus and method which addresses the above-referenced limitations.

SUMMARY

In one aspect of the present invention, it is contemplated that vehicle electronic control unit includes a power input port, which receives electric power from a vehicle battery, and a power output port, which provides electric power to a vehicle electronic device including an antenna. The electronic device receives data transmissions from a vehicle sensor. The power output port provides substantially uninterrupted electric power from the vehicle battery to the vehicle electronic device. A communication port is electrically connected to a vehicle communication bus, the communication port receives data transmissions from the vehicle electronic device via the communication port. An electronic component, electrically connected to the communication port, is initially in a first state when a vehicle ignition is off. One of the data transmissions from the vehicle electronic device received by the electronic component via the communication port switches the electronic component from the first state to a second state when the vehicle ignition is off. The electronic component, while in the second state and while the vehicle ignition is off, receives additional data transmissions from the vehicle electronic device indicating statuses of respective vehicle sensors.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
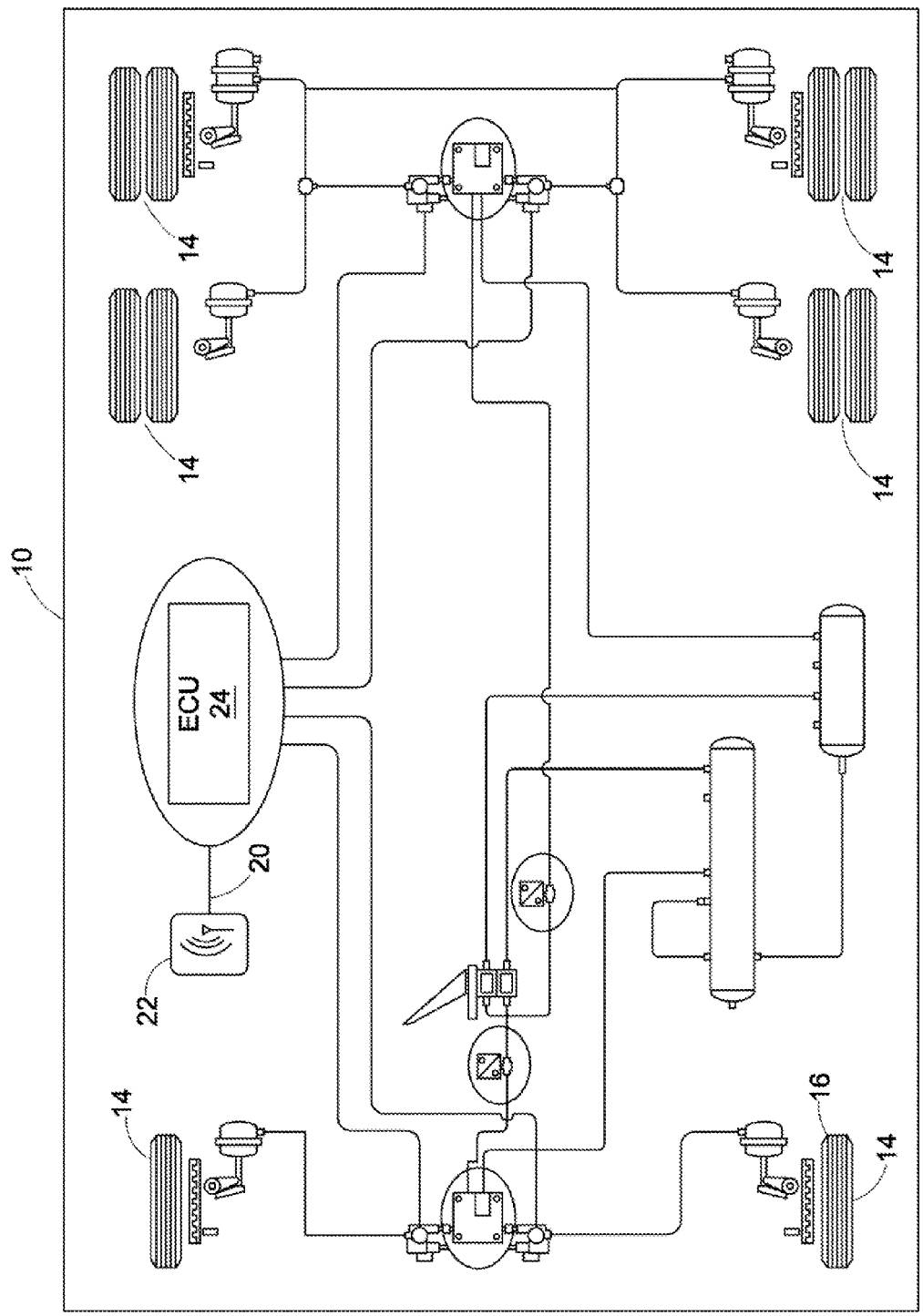
FIG. 1 illustrates a schematic representation of a vehicle including a system for monitoring a tire status in accordance with one embodiment of an apparatus illustrating principles of the present invention.
Figure 2:
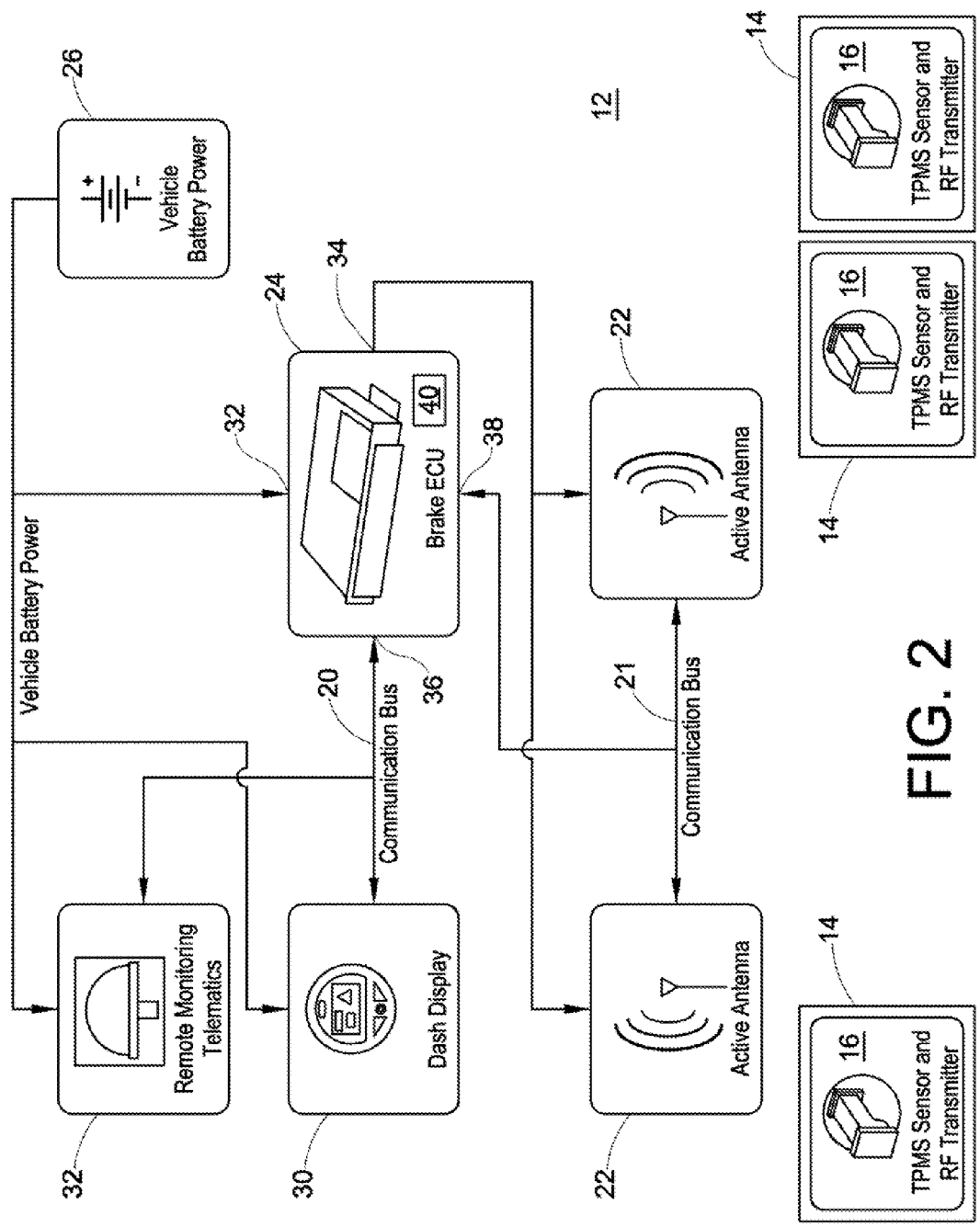
FIG. 2 illustrates a schematic representation of a system on the vehicle for monitoring a tire statuses in accordance with one embodiment of an apparatus illustrating principles of the present invention.

With reference to FIGS. 1 and 2, a simplified component diagram of an exemplary vehicle 10 including a system 12 for monitoring one or more statuses of tires 14 on the vehicle 10 is illustrated in accordance with one embodiment of the present invention. It is contemplated that the system 12 monitors at least one of pressure and temperature of the respective tires.

With reference to FIGS. 1 and 2, the system 12 includes respective tire sensors 16 (e.g., tire pressure and/or temperature sensors) associated with the tires 14 (e.g., in the tires 14). Although only one tire sensor 16 is illustrated in FIG. 1 and only three (3) tire sensors 16 are illustrated in FIG. 2, it is to be understood that each of the tires 14 may include a tire sensor 16. Each of the tire sensors 16 periodically senses at least one of the statuses of the respective tires 14. The tire sensors 16 also periodically transmit respective data transmissions indicative of the at least one sensed statuses. It is contemplated that the data transmissions include a data signal indicating the at least one of the sensed statuses of the respective tires 14. Other wireless applications, such as an ambient temperature sensor and/or an air bag pressure sensor, that use wireless sensors to transmit periodic signals using radio frequency antennas are also contemplated.

The vehicle 10 includes a first communication bus 20. The vehicle may also include a second communication bus 21. In one embodiment, the first communication bus 20 is a vehicle communication bus (e.g., a J1939 CAN bus), and the second communication bus 21 is a proprietary bus (e.g., a local interconnect network (LIN) bus). Although the first and second communication busses 20, 21, respectively, are illustrated as two (2) different busses, it also contemplated in alternate embodiments that the first and second communication busses 20, 21, respectively, are a single communication bus (e.g., either a vehicle communication bus such as a J1939 CAN bus, or a proprietary bus such as a local interconnect network (LIN) bus). At least one vehicle electronic device 22 (including an antenna) is mounted on the vehicle 10. In the illustrated embodiment, each of the tire sensors 16 transmits the data transmissions to the at least one vehicle antenna 22 via radio frequency signals. In the illustrated embodiment, each of the antennas 22 is electrically connected to the second communication bus 21. Alternatively, as discussed above, other embodiments in which the first and second busses 20, 21, respectively, are a single communication bus, the antennas are electrically connected to the single communication bus.

A vehicle electronic control unit (ECU) 24, vehicle battery, dash display 30, and telematics 32 (e.g., remote monitoring telematics) are also electrically connected to the vehicle communication bus 20. The ECU 24, dash display 30, and telematics 32 receive substantially constant electrical power from a vehicle battery 26, even when the vehicle 10 is off (e.g., when a vehicle ignition is off). In one embodiment, the at least one vehicle antenna 22 also receive substantially constant electrical power from the vehicle battery 26, even when the vehicle 10 is off, via the ECU 24. It is contemplated that the ECU 24 is a brake ECU.

In one embodiment, the ECU 24 includes a power input port 32, a power output port 34, and at least one first data input/output (I/O) port 36, each of which is electrically connected to the communication bus 20, and at least one second data input/output (I/O) port 38, each of which is electrically connected to the proprietary bus 21. In the alternate embodiment discussed above in which the first and second communication busses 20, 21, respectively, are a single communication bus, it is contemplated that the first and second data input/output (I/O) ports 36, 38 are the same ports (e.g., electrically the same ports). In the illustrated embodiment, the ECU 24 receives the electric power from the vehicle battery 26 the power input port 32. The ECU 24 transmits the electric power to the at least one vehicle antenna 22 via the power output port 34. The ECU 24 transmits and receives data to/from the at least one vehicle antenna 22, the dash display 30 and the telematics 32 via the data I/O port 36 and the vehicle communication bus 20. The ECU 24 also includes an electronic component 40.

Figure 3:
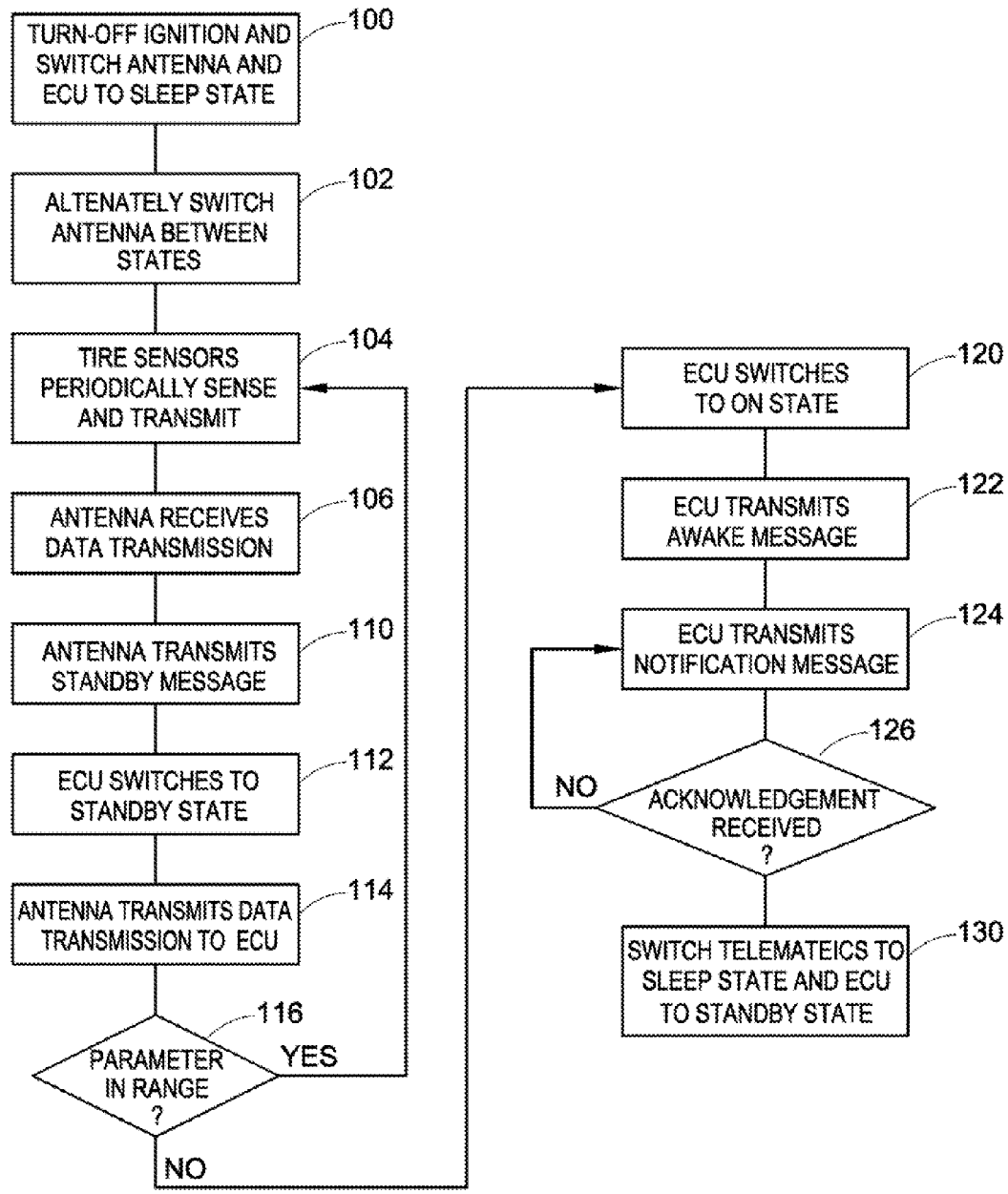
FIG. 3 is an exemplary methodology of monitoring a tire statuses in accordance with one embodiment illustrating principles of the present invention.

The at least one vehicle antenna 22 receives the data transmissions (e.g., radio frequency data transmissions) from the tire sensors 16. When the vehicle ignition is turned-off (see Step 100 of FIG. 3), the at least one vehicle antenna 22 switches to a first state (e.g., a sleep state) from a second state (e.g., an awake state). Then, while the vehicle ignition is off, the at least one vehicle antenna 22 alternately switches between the first state and the second state (see Step 102). For example, the tire sensors 16 may periodically sense the at least one of the statuses of the respective tires 14 and then transmit the respective data transmissions, which are indicative of the at least one sensed statuses, to the at least one vehicle antenna 22 (see Step 104) about every five (5) minutes. While the vehicle ignition is off, the at least one vehicle antenna 22 switches from the first state to the second state, for example, above every four (4) hours, and then remains in the second state, for example, for about five (5) minutes. While the ignition is off, and while the at least one vehicle antenna 22 is in the awake state, the at least one vehicle antenna 22 receives one or more of the data transmissions (e.g., radio frequency data transmissions) from the tire sensors 16 (see Step 106). The at least one vehicle antenna 22 then transmits each of the data transmissions to the ECU 24. In one embodiment, the at least one vehicle antenna 22 transmits the data transmissions to the ECU 24 via the proprietary communication bus 21 and the data I/O port 38.

The electronic component 40 of the ECU 24 (and the ECU 24 itself) switches between three (3) different states (e.g., a first (e.g., sleep) state during which minimal operation of the electronic component 40 and the ECU 24 are maintained with little or no power, a second (e.g., standby) state during which the ECU 24 is listening to the vehicle bus 20 and/or the proprietary communication bus 21, and a third (e.g., on) state during which the ignition is on and the ECU 24 can perform all of the braking functions). While the vehicle ignition is on (e.g., the vehicle engine is running), the electronic component 40 of the ECU 24 is in the third state. When the vehicle ignition is turned-off (e.g., the vehicle engine is stopped and no longer running), the ECU 24 switches from the third state to the first state.

After receiving the first of the data transmissions from the tire sensors 16, and before transmitting the first of the data transmissions to the ECU 24, the vehicle antenna 22 transmits a "trigger" message (e.g., a standby message) to the electronic component 40 of the ECU 24 (see Step 110). The trigger message causes the ECU 24 to transition from one state to another state (e.g., from the first state to the second state). In one embodiment, while in the first state, the ECU 24 does not decode the data transmissions received from the vehicle antenna 22. Therefore, the ECU 24 does not decode the trigger message. After receiving the trigger message and transitioning from the first state to the second state, the ECU 24 decodes subsequent data transmissions received from the vehicle antenna 22. In the manner discussed above, the trigger message is transmitted from the vehicle antenna 22 to the electronic component 40 of the ECU 24 via the communication bus 21 and the data I/O port 38. Although the electronic component 40 of the ECU 24 is initially in the first state while the vehicle ignition is off), the electronic component 40 (and the ECU 24) switches to the second state from, for example, the first state once the electronic component 40 of the ECU 24 receives the trigger message (see Step 112).

After sending the trigger message, the vehicle antenna 22 transmits the first data transmission to the ECU 24. The vehicle antenna 22 continues transmitting any subsequent data transmissions from, for example, other ones of the tire sensors 16 to the electronic component 40 of the ECU 24 (see Step 114) until the vehicle antenna 22 switches from the second (e.g., awake) state to the first (e.g., sleep) state (e.g., at the end of about five (5) minutes). Therefore, the electronic component 40 receives periodically transmitted data transmissions from the vehicle antenna 22 while the electronic component 40 (and the ECU 24) are in the second (e.g., standby) state.

Whenever the electronic component 40 of the ECU 24 receives a data transmission including one or more of the sensed statuses of a vehicle tire 14, the electronic component 40 determines if the sensed status is within an acceptable range (or if the sensed status indicates the tire sensors 16 or the vehicle antenna 22 is faulted or not faulted) (see Step 116). It is contemplated that in addition to the sensed status, the data transmissions from the tire sensors 16 (and from the at least one vehicle antenna 22) include an identifier indicating to which of the tires 14 on the vehicle 10 the sensed status is associated. Therefore, for example, the electronic component 40 of the ECU 24 determines if the pressure and/or temperature of the respective tire 14 is not within a respective acceptable (e.g., predetermined) range. If the sensed status is within the acceptable range, control returns to the Step 104. Otherwise, if the sensed status is not within the acceptable range, in one embodiment, the electronic component 40 (and the ECU 24) switch from the second (e.g., standby) state to the third (e.g., on) state (see Step 120). Since the vehicle ignition may be off, the telematics 32 may be in a first (e.g., sleep) state. In that case, the electronic component 40 optionally transmits a wake-up message to the telematics 32 (see Step 122), to switch the telematics 32 from the first (e.g., sleep) state to a second (e.g., awake) state. Then, the electronic component 40 transmits a notification message to the communication bus 20 (see Step 124). If the electronic component 40 does not transmit the optional wake-up message to the telematics 32 in the Step 122 to switch the telematics 32 from the first (e.g., sleep) state to the second (e.g., awake) state, the telematics 32 will switch to the second (e.g., awake) state upon receiving the notification message from the electronic component 40.

It is contemplated that the notification message from the electronic component 40 may include one or more respective messages to the dash display 30 and telematics 32 via the communication bus 20. For example, the notification message to the dash display 30 may cause the dash display 30 to alert a vehicle operator (who, since the vehicle is not running, may be sleeping in the vehicle cab) via a visual or audible notification. The notification message to the telematics 32 may cause the telematics 32 to transmit a radio-frequency out-of-range message to a remote receiver or recipient. For example, the out-of-range message may be in the form of an e-mail, text message, or voice message transmitted to a remote recipient such as a smart-phone and/or a pager.

In one embodiment, it is contemplated that, to confirm the remote recipient received the out-of-range message, the telematics 32 await to receive an acknowledgement from the remote recipient. It is also contemplated that the once the telematics 32 transmit the out-of-range message to the remote recipient, the telematics 32 transmit an acknowledgement message to the electronic component 40 so the electronic component 40 may confirm the out-of-range message was transmitted to the remote recipient. If the telematics 32 waits to receive an acknowledgement from the remote recipient, the electronic component 40 may wait to receive an acknowledgement from the telematics 32 indicating that the remote recipient received the out-of-range message. If one or more of the acknowledgement messages is/are not received within a predetermined time (see Step 126), the electronic component 40 may re-send the notification message and/or the telematics 32 may re-send the out-of-range message (see Step 124).

In order to reduce power consumption, once the respective acknowledgement messages are received, the telematics 32 may switch from the second (e.g., awake) state to the first (e.g., sleep) state, and the electronic component 40 may switch from the third (e.g., on) state to the second (e.g., standby) state (see Step 130). Otherwise, if the telematics 32 and/or the electronic component 40 is/are not programmed to wait for respective acknowledgements, the telematics 32 switches to the first (e.g., sleep) state and/or the electronic component 40 switches to the second (e.g., standby) state after transmitting the respective messages (see Step 130).

The electronic component 40 may return to the first (e.g., sleep) state if no data transmissions are received from the vehicle antenna 22 for a predetermined length of time.

It is to be understood that the system 12 and method described above is for monitoring tire statuses and notifying the remote recipients while the vehicle ignition is off (e.g., the vehicle is not running). Since all of the tire statuses may be monitored and the vehicle operator or a remote recipient may be notified while the ignition is off, it is expected that when the ignition is turned-on, all of the statuses for all of the tires 14 have been sensed and any notifications and/or out-of-range messages have been transmitted since the most recent respective periodic cycles of the at least one vehicle antenna 22 and the tire sensors 16. Therefore, delays encountered in conventional systems, which do not operate to monitor tire statuses and/or notify remote recipients while the vehicle ignition is off, are reduced by the embodiments discussed above.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A vehicle electronic control unit, comprising:
   a power input port receiving electric power from a vehicle battery;
   a power output port providing electric power to a vehicle electronic device including an antenna that receives data transmissions from a vehicle sensor, the power output port providing substantially uninterrupted electric power from the vehicle battery to the vehicle electronic device;
   a communication port electrically connected to a vehicle communication bus, the communication port receiving data transmissions from the vehicle electronic device via the communication bus; and
   an electronic component, electrically connected to the communication port, initially in a sleep state, during which the electronic component receives but does not decode data transmissions from the vehicle electronic device, after a vehicle ignition is turned off, one of the data transmissions from the vehicle electronic device received by the electronic component via the communication port, after being in the initial sleep state and after receiving the one of the data transmissions, the electronic component then switching from the initial sleep state to a standby state, during which the electronic component receives and decodes data transmissions from the vehicle electronic device, when the vehicle ignition is still off, the electronic component, while in the standby state and while the vehicle ignition is still off, receiving and decoding additional data transmissions from the vehicle electronic device indicating statuses of respective vehicle sensors.

2. The vehicle electronic control unit as set forth in claim 1, wherein:
   while in the standby state and while the vehicle ignition is off, the electronic component determines if any of the statuses of any of the vehicle sensors is not within an acceptable range.

3. The vehicle electronic control unit as set forth in claim 2, wherein:
   if any of the statuses of any of the vehicle sensors is not within the acceptable range, the electronic component transmits a respective out-of-range message to the vehicle communication bus.

4. The vehicle electronic control unit as set forth in claim 2, wherein:
   if any of the statuses of any of the vehicle sensors is not within the acceptable range, the electronic component transmits a wake-up message to at least one of the vehicle communication bus, telematics, and a dash display.

5. The vehicle electronic control unit as set forth in claim 3, wherein:
   before transmitting the respective out-of-range message to the communication bus, the electronic component transmits a vehicle telematics wake-up message to at least one of the vehicle communication bus, telematics, and a dash display; and
   the respective out-of-range message is transmitted to at least one of the communication bus, the telematics, and the dash display.

6. The vehicle electronic control unit as set forth in claim 3, wherein:
   the electronic component switches from the standby state to an on state before sending the respective out-of-range message to the vehicle communication bus.

7. The vehicle electronic control unit as set forth in claim 3, wherein if the vehicle ignition is off:
after the electronic component transmits the respective out-of-range message to the vehicle communication bus, the electronic component switches to the sleep state.

8. The vehicle electronic control unit as set forth in claim 1, wherein the electronic component receives the additional ones of the data transmissions from the vehicle electronic device indicating at least one of respective pressures of vehicle tires and respective temperatures of the vehicle tires.

9. A system for monitoring a status of tires on a vehicle including a plurality of tires, the system comprising:
respective tire sensors in the vehicle tires, each of the tire sensors periodically sensing a status of the respective tire and transmitting data transmissions indicative of the sensed status;
a vehicle electronic device including an antenna receiving the data transmissions from the tire sensors, the vehicle antenna periodically transmitting the data transmissions received from the tire sensors; and
an electronic control unit, including:
a power input port receiving electric power from a vehicle battery;
a power output port providing electric power to the antenna, the power output port providing substantially uninterrupted electric power from the vehicle battery to the antenna; and
an electronic component, initially in a sleep state, during which the electronic component receives but does not decode data transmissions from the vehicle electronic device, after a vehicle ignition is turned off, and then, after being in the initial sleep state while the vehicle ignition is still off and after receiving a trigger message from the antenna, the electronic component switching from the initial sleep state to a standby state during which the electronic component receives and decodes data transmissions from the vehicle electronic device, the electronic component receiving and decoding the periodically transmitted data transmissions from the antenna while in the standby state and while the vehicle ignition is still off.

10. The system for monitoring a status of tires on a vehicle as set forth in claim 9, the system further including:
a proprietary communication bus;
wherein the antenna is electrically connected to the proprietary communication bus; and
wherein the electronic component is electrically connected to the proprietary communication bus, the electronic component receiving the trigger message and the data transmissions from the antenna via the proprietary communication bus.

11. The system for monitoring a status of tires on a vehicle as set forth in claim 10, wherein:
the tire sensors transmit the data transmissions indicative of the sensed status to the antenna via radio frequency signals.

12. The system for monitoring a status of tires on a vehicle as set forth in claim 9, wherein:
the electronic component determines if the sensed status is not within an acceptable range; and
the system further includes:
telematics that transmit a radio frequency status out-of-range message to a remote recipient if the status is not within the acceptable range.

13. The system for monitoring a status of tires on a vehicle as set forth in claim 12, the system further including:
a proprietary communication bus;
wherein the antenna is electrically connected to the proprietary communication bus;
wherein the electronic component is electrically connected to the proprietary communication bus, the electronic component receiving the trigger message and the data transmissions from the antenna via the proprietary communication bus;
wherein the telematics are electrically connected to a vehicle communication bus;
wherein before transmitting the status out-of-range message to the telematics via the vehicle communication bus, the electronic component switches from the standby state to an on state and transmits a vehicle telematics wake-up message to the telematics via the vehicle communication bus; and
wherein after the electronic component transmits the status out-of-range message to the telematics, the electronic component switches to the sleep state.

14. The system for monitoring a status of tires on a vehicle as set forth in claim 9, the system further including:
a communication bus;
wherein the antenna is electrically connected to the communication bus;
wherein the electronic component is electrically connected to the communication bus, the electronic component receiving the trigger message and the data transmissions from the antenna via the communication bus;
wherein telematics are electrically connected to the communication bus;
wherein before transmitting a status out-of-range message to the telematics via the communication bus, the electronic component switches from the standby state to an on state and transmits a vehicle telematics wake-up message to the telematics via the communication bus; and
wherein after the electronic component transmits the status out-of-range message to the telematics, the electronic component switches to the sleep state.

15. The system for monitoring a status of tires on a vehicle as set forth in claim 9, wherein:
while the vehicle ignition is off, the antenna alternately switches between a sleep state and an awake state;
while the antenna is in the awake state, the antenna receives one of the data transmissions indicative of one or more of the sensed statuses from the tire sensors;
while the antenna is in the awake state, after the antenna receives one of the data transmissions indicative of the at least one sensed status from the tire sensors, the antenna transmits the trigger message to the electronic component; and
after the antenna transmits the trigger message to the electronic component, the antenna transmits the one of the data transmissions to the electronic component.

16. The system for monitoring a status of tires on a vehicle as set forth in claim 15, wherein:
while the vehicle ignition is off, the electronic component switches from the sleep state to a standby state upon receiving the trigger message from the antenna;
wherein the electronic component receives the one of the data transmissions while in the standby state;
while the vehicle ignition is off and after receiving the data transmissions, the electronic component determines if the status is within an acceptable range;
if the status is not within the acceptable range, the electronic component switches to an on state and transmits an out-of-range message to telematics;
upon receiving the out-of-range message, the telematics transmit a radio frequency out-of-range message to a remote receiver; and after transmitting the out-of-range message to telematics, the electronic component switches to the sleep state.

17. The system for monitoring a status of tires on a vehicle as set forth in claim 9, wherein:
   the tire sensors transmit the respective data transmissions indicative of the sensed status about every 5 minutes; and
   the antenna switches from the sleep state to the awake state for about 5 minutes about every 4 hours.

18. A method for monitoring a status of sensors on a vehicle, the method comprising:
   periodically sensing and transmitting a data signal indicating a status for one of the sensors on the vehicle;
   periodically switching an antenna from a sleep state to an awake state, the antenna receiving the data signal while in the awake state;
   when the vehicle ignition is turned off, initially switching an electronic control unit to a sleep state, during which the electronic component receives but does not decode data transmissions from the antenna;
   while the electronic control unit is still in the initial sleep state and while the vehicle ignition is still off, transmitting a trigger message from the antenna to the electronic control unit to subsequently switch the electronic control unit from the initial sleep state to a standby state, during which the electronic component receives and decodes data signals from the antenna, while the vehicle ignition is still off;
   after the electronic control unit has switched to the standby state and while the vehicle ignition is still off, transmitting an antenna data signal, indicating the status, from the antenna to the electronic control unit; and
   after the electronic control unit has switched to the standby state and while the vehicle ignition is still off, the electronic control unit receiving and decoding the antenna data signal and determining if the status is in an acceptable range based on the data signal received from the antenna.

19. The method for monitoring a status of sensors on a vehicle as set forth in claim 18, wherein if the status is not in the acceptable range:
   while the electronic control unit is in the standby state and while the vehicle ignition is off, transmitting a notification signal to a remote receiver.

20. The method for monitoring a status of sensors on a vehicle as set forth in claim 19, wherein the step of transmitting the notification signal to the remote receiver includes:
   transmitting an out-of-range signal from the electronic control unit to the telematics; and
   transmitting the notification signal from the telematics to the remote receiver.

21. The method for monitoring a status of sensors on a vehicle as set forth in claim 20, wherein the step of transmitting the notification signal to the remote receiver further includes:
   switching the electronic control unit from the standby state to an on state.

22. The method for monitoring a status of sensors on a vehicle as set forth in claim 19, further including:
   confirming an acknowledgement is received by the electronic control unit from the telematics; and
   after the acknowledgement is received, switching the electronic control unit to the sleep state.

\* \* \* \* \*